(12) United States Patent
Garcia

(10) Patent No.: US 11,639,156 B2
(45) Date of Patent: May 2, 2023

(54) PORTABLE VEHICLE WASHING ASSEMBLY

(71) Applicant: Jose Garcia, Bridgeport, CT (US)

(72) Inventor: Jose Garcia, Bridgeport, CT (US)

(\*) Notice: Subject to any disclaimer, the term of this patent is extended or adjusted under 35 U.S.C. 154(b) by 128 days.

(21) Appl. No.: 17/203,804

(22) Filed: Mar. 17, 2021

(65) Prior Publication Data
US 2022/0297639 A1    Sep. 22, 2022

(51) Int. Cl.
*B60S 1/66* (2006.01)
*B08B 3/02* (2006.01)
*B08B 13/00* (2006.01)
*B60S 3/04* (2006.01)

(52) U.S. Cl.
CPC .............. *B60S 1/66* (2013.01); *B08B 3/02* (2013.01); *B08B 3/026* (2013.01); *B08B 13/00* (2013.01); *B60S 3/04* (2013.01); *B08B 2203/0217* (2013.01)

(58) Field of Classification Search
CPC ..... B60S 1/66; B60S 3/04; B08B 3/02; B08B 3/026; B08B 13/00; B08B 2203/0217
See application file for complete search history.

(56) References Cited

U.S. PATENT DOCUMENTS

| | | | | |
|---|---|---|---|---|
| 2,689,577 A | * | 9/1954 | Dunn | B60S 3/04 134/123 |
| 2,703,579 A | * | 3/1955 | Merancy | B60S 3/04 15/301 |
| 2,865,034 A | * | 12/1958 | Petite | B60S 3/006 134/123 |
| 2,965,305 A | | 12/1960 | Glazer | |
| 3,179,117 A | * | 4/1965 | Gibson | B60P 3/00 134/107 |
| 3,258,019 A | * | 6/1966 | Bellas | B60S 3/04 134/123 |
| 3,401,701 A | | 9/1968 | Horwitz | |
| 3,409,030 A | * | 11/1968 | Schmidt | B60S 3/04 118/316 |
| 3,444,867 A | | 5/1969 | Thornton | |
| 3,795,929 A | * | 3/1974 | Thompson | B60S 3/06 15/53.2 |
| 4,794,938 A | * | 1/1989 | Petit | B60S 3/04 134/123 |
| 4,936,330 A | | 6/1990 | LaHue | |

(Continued)

FOREIGN PATENT DOCUMENTS

WO    WO2012009615    1/2012

*Primary Examiner* — Benjamin L Osterhout

(57) ABSTRACT

A portable vehicle washing assembly for automatically washing vehicles in a remote location includes a frame that includes a plurality of legs and a roof to have a vehicle drive beneath the frame. A plurality of first sprinklers is each of the first sprinklers is disposed on the frame to spray a liquid onto the vehicle. A plurality of second sprinklers is disposed on the frame to spray a liquid onto the vehicle. A first fluid pump is disposed on the support cage to pump a fluid and a liquid soap into the first sprinklers for washing the vehicle. A second fluid pump is disposed on the frame and the second fluid pump is in fluid communication with each of the second sprinklers to spray a mixture of the fluid and the liquid soap onto the vehicle for washing the vehicle.

18 Claims, 10 Drawing Sheets

(56) References Cited

U.S. PATENT DOCUMENTS

| | | | |
|---|---|---|---|
| 5,033,489 A * | 7/1991 | Ferre | E04H 5/02 |
| | | | 134/107 |
| 5,098,023 A | 3/1992 | Burke | |
| 5,255,695 A * | 10/1993 | Downey | B60S 3/04 |
| | | | 134/123 |
| D701,357 S | 3/2014 | Barrios | |
| 8,721,805 B2 | 5/2014 | Barrios | |
| 2002/0117191 A1* | 8/2002 | Krenzel | B08B 17/00 |
| | | | 134/199 |
| 2002/0148490 A1* | 10/2002 | Flaxman | B60S 3/04 |
| | | | 134/123 |
| 2002/0162575 A1* | 11/2002 | Fratello | B60S 3/04 |
| | | | 134/123 |
| 2003/0019509 A1* | 1/2003 | Locascio | B08B 17/00 |
| | | | 134/10 |
| 2003/0164183 A1* | 9/2003 | Gingl | B60S 13/02 |
| | | | 134/131 |
| 2004/0221878 A1* | 11/2004 | Johnson | B60S 3/04 |
| | | | 134/123 |
| 2005/0066997 A1* | 3/2005 | Watford | B60S 3/00 |
| | | | 134/123 |
| 2005/0133071 A1* | 6/2005 | Brady | B60S 3/04 |
| | | | 134/123 |
| 2006/0011220 A1* | 1/2006 | Mueller | B08B 3/022 |
| | | | 134/123 |
| 2006/0107486 A1* | 5/2006 | Andre | B08B 1/02 |
| | | | 15/345 |
| 2008/0066790 A1* | 3/2008 | Rems | B08B 13/00 |
| | | | 134/123 |
| 2009/0188535 A1* | 7/2009 | Taylor | B60S 3/04 |
| | | | 137/314 |
| 2009/0211605 A1* | 8/2009 | Ahmad | B60S 1/528 |
| | | | 134/123 |
| 2009/0217944 A1* | 9/2009 | Munera | B08B 3/022 |
| | | | 134/32 |
| 2011/0277797 A1* | 11/2011 | Turner | B60S 3/00 |
| | | | 134/123 |
| 2012/0145192 A1* | 6/2012 | MacKinnon | B08B 3/02 |
| | | | 134/10 |
| 2013/0098403 A1* | 4/2013 | Zeile | B08B 17/025 |
| | | | 134/34 |
| 2017/0361812 A1* | 12/2017 | McCormick | B08B 3/02 |
| 2018/0015906 A1* | 1/2018 | Gimena | B60S 1/66 |
| 2021/0252535 A1* | 8/2021 | Sattler | B08B 3/08 |
| 2021/0276515 A1* | 9/2021 | Duperon | B60S 3/04 |

* cited by examiner

PORTABLE VEHICLE WASHING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to washing devices and more particularly pertains to a new washing device for automatically washing a vehicle in a remote location. The device includes a frame under which a vehicle can drive, a plurality of sprinklers and fluid pumps for pumping fluid to the sprinklers. Additionally, the device includes a reclamation unit for reclaiming used water and liquid soap.

(2) Description of Related Art Including Information Disclosed Under 37 CFR 1.97 and 1.98

The prior art relates to washing devices including a variety of triangular frames for supporting vehicle washing equipment. The prior art also discloses an enclosed washing unit for washing shopping carts. The prior art discloses an entry that has a plurality of sprayers integrated therein such that the sprayers wash a vehicle when the vehicle drives through the entry. The prior art discloses a modular cleaning facility that is transported on a trailer.

BRIEF SUMMARY OF THE INVENTION

An embodiment of the disclosure meets the needs presented above by generally comprising a frame that includes a plurality of legs and a roof to have a vehicle drive beneath the frame. A plurality of first sprinklers is each of the first sprinklers is disposed on the frame to spray a liquid onto the vehicle. A plurality of second sprinklers is disposed on the frame to spray a liquid onto the vehicle. A first fluid pump is disposed on the support cage to pump a fluid and a liquid soap into the first sprinklers for washing the vehicle. A second fluid pump is disposed on the frame and the second fluid pump is in fluid communication with each of the second sprinklers to spray a mixture of the fluid and the liquid soap onto the vehicle for washing the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
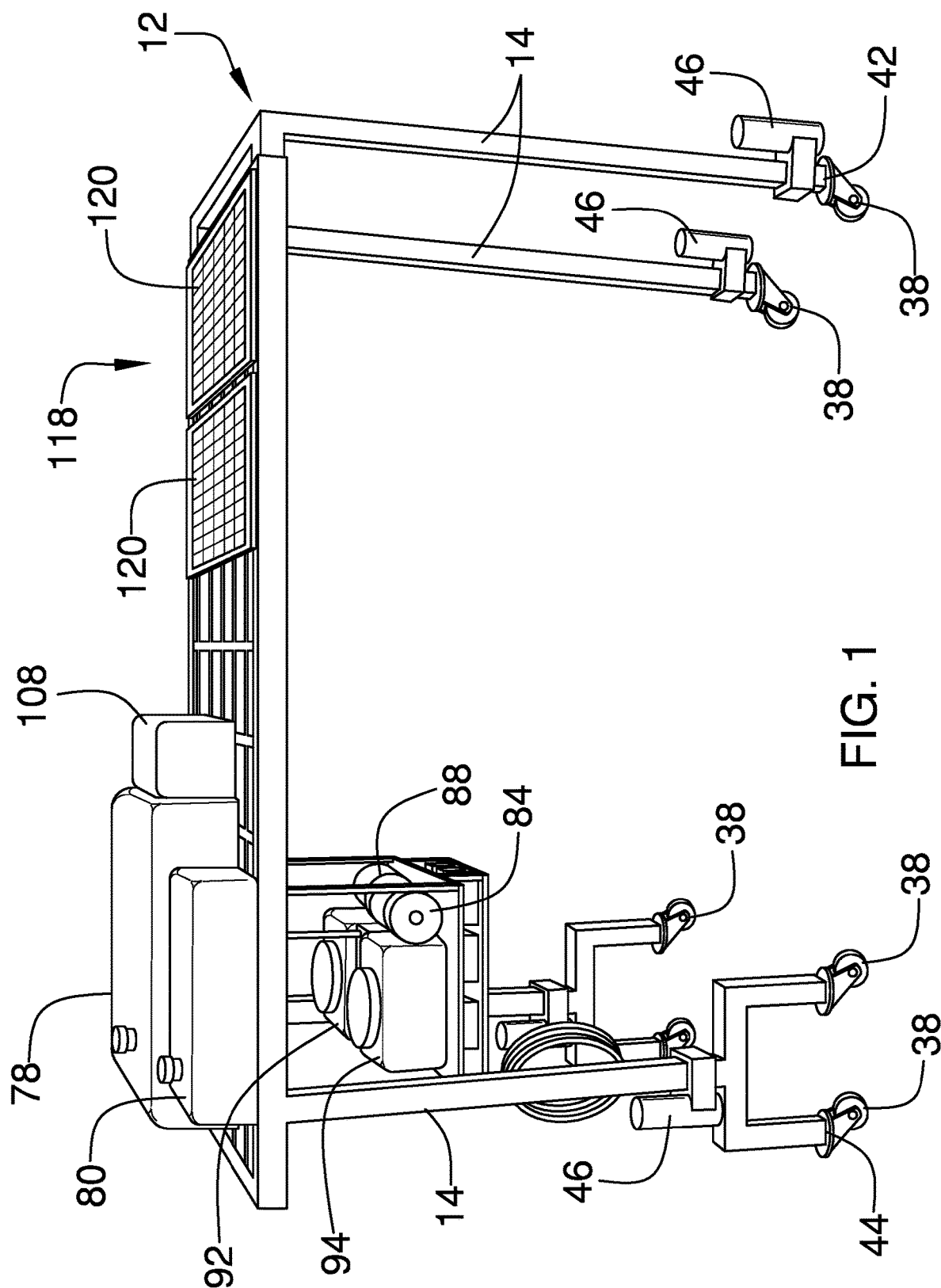
FIG. 1 is a perspective view of a portable vehicle washing assembly according to an embodiment of the disclosure.
Figure 2:
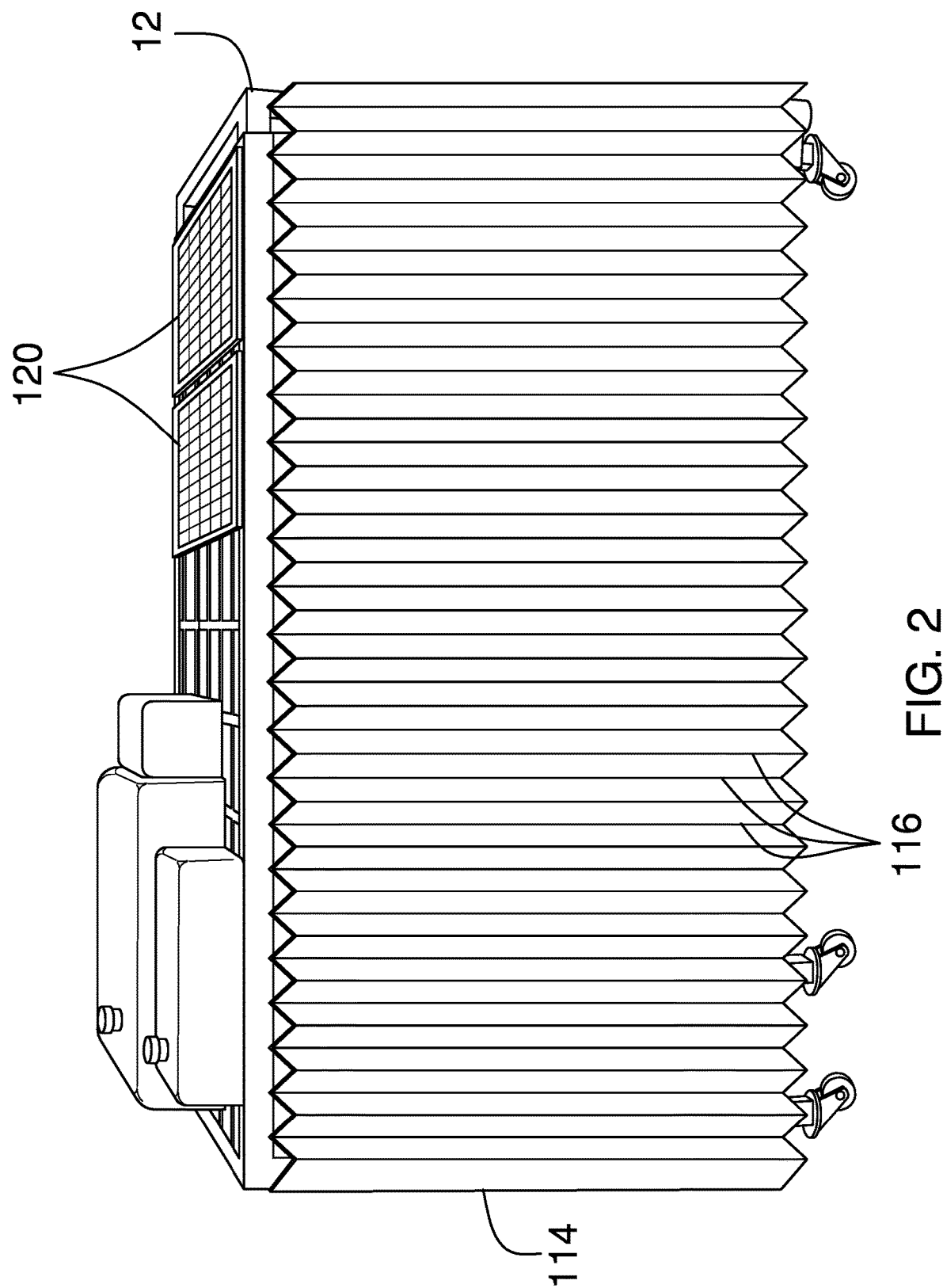
FIG. 2 is a left side view of an embodiment of the disclosure showing a curtain extended along a frame.
Figure 3:
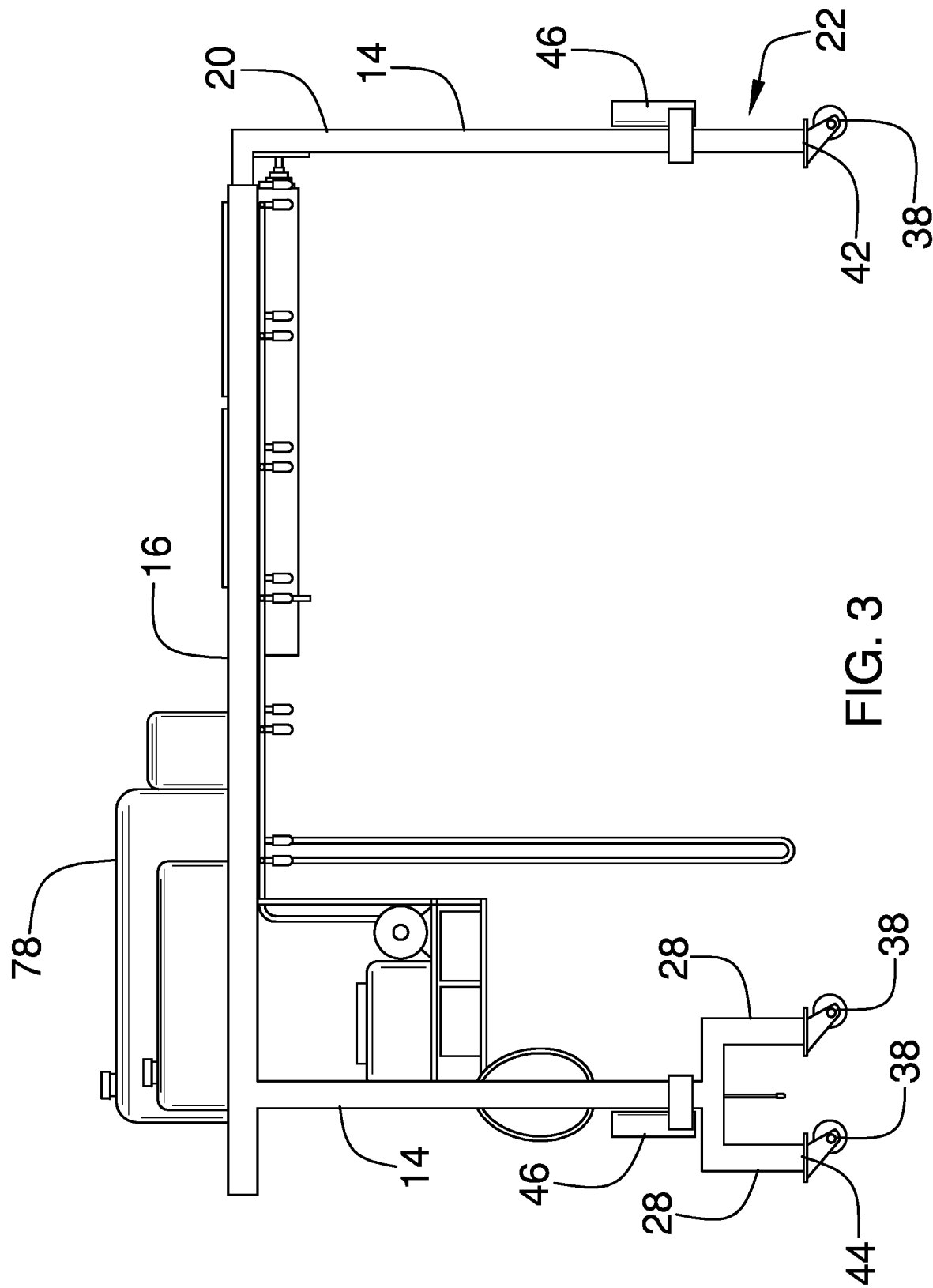
FIG. 3 is a left view of an embodiment of the disclosure.
Figure 4:
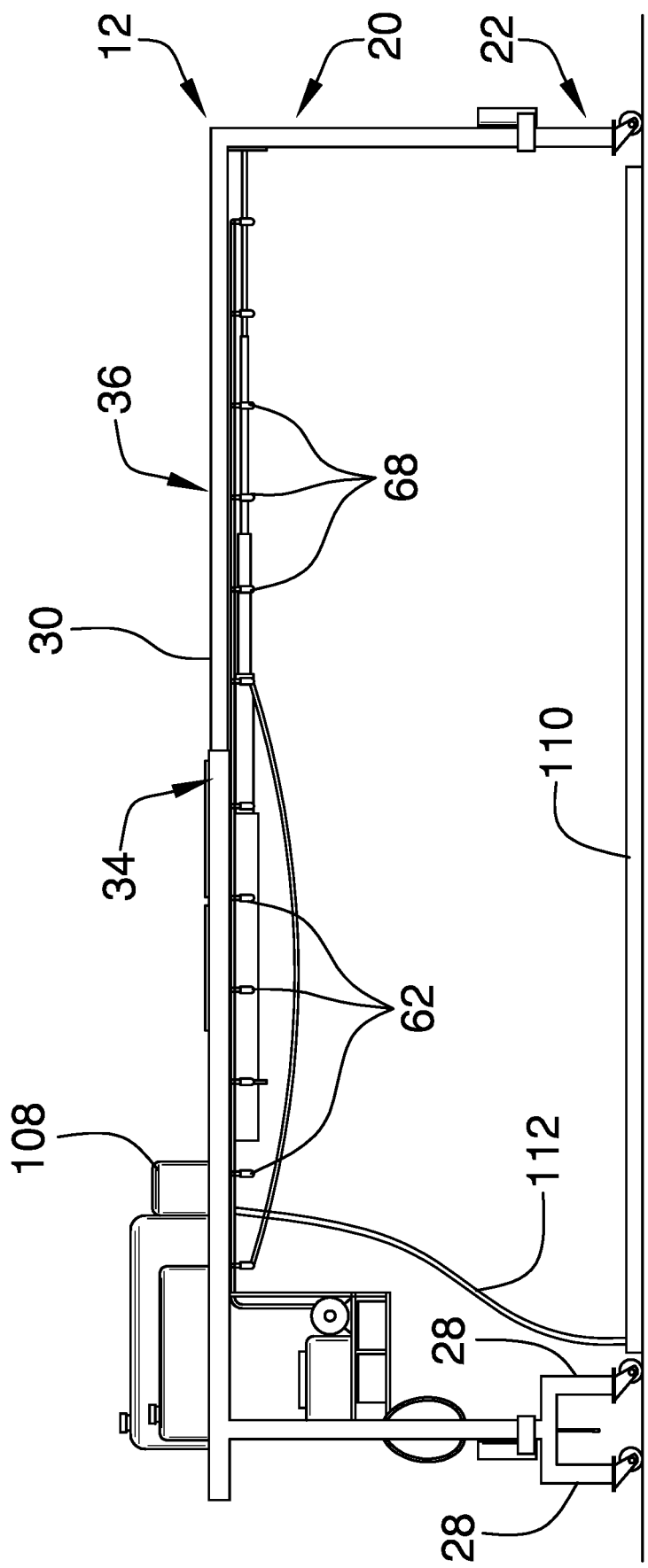
FIG. 4 is a left view of an embodiment of the disclosure showing a roof in an extended position.
Figure 5:
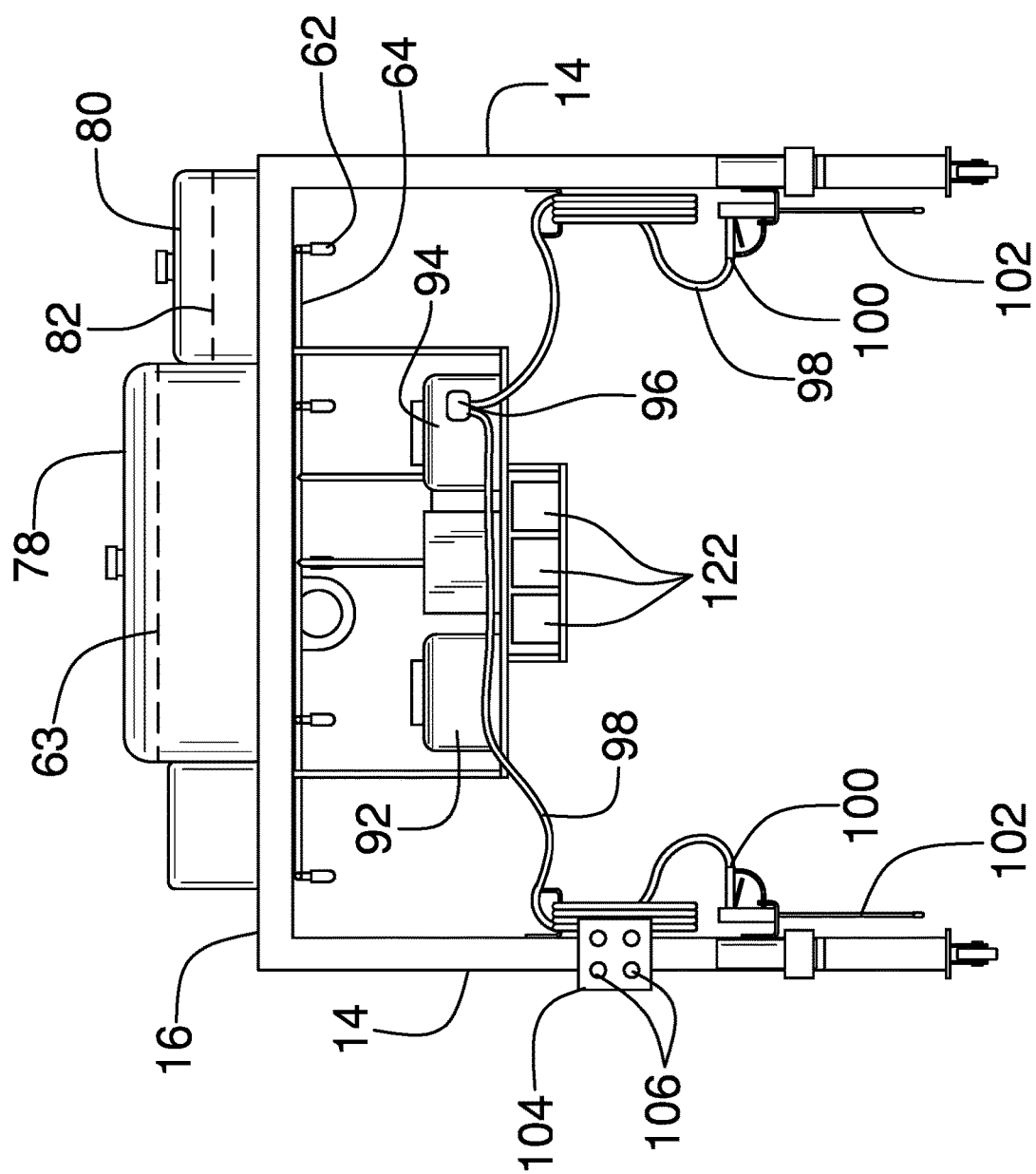
FIG. 5 is a front view of an embodiment of the disclosure.
Figure 6:
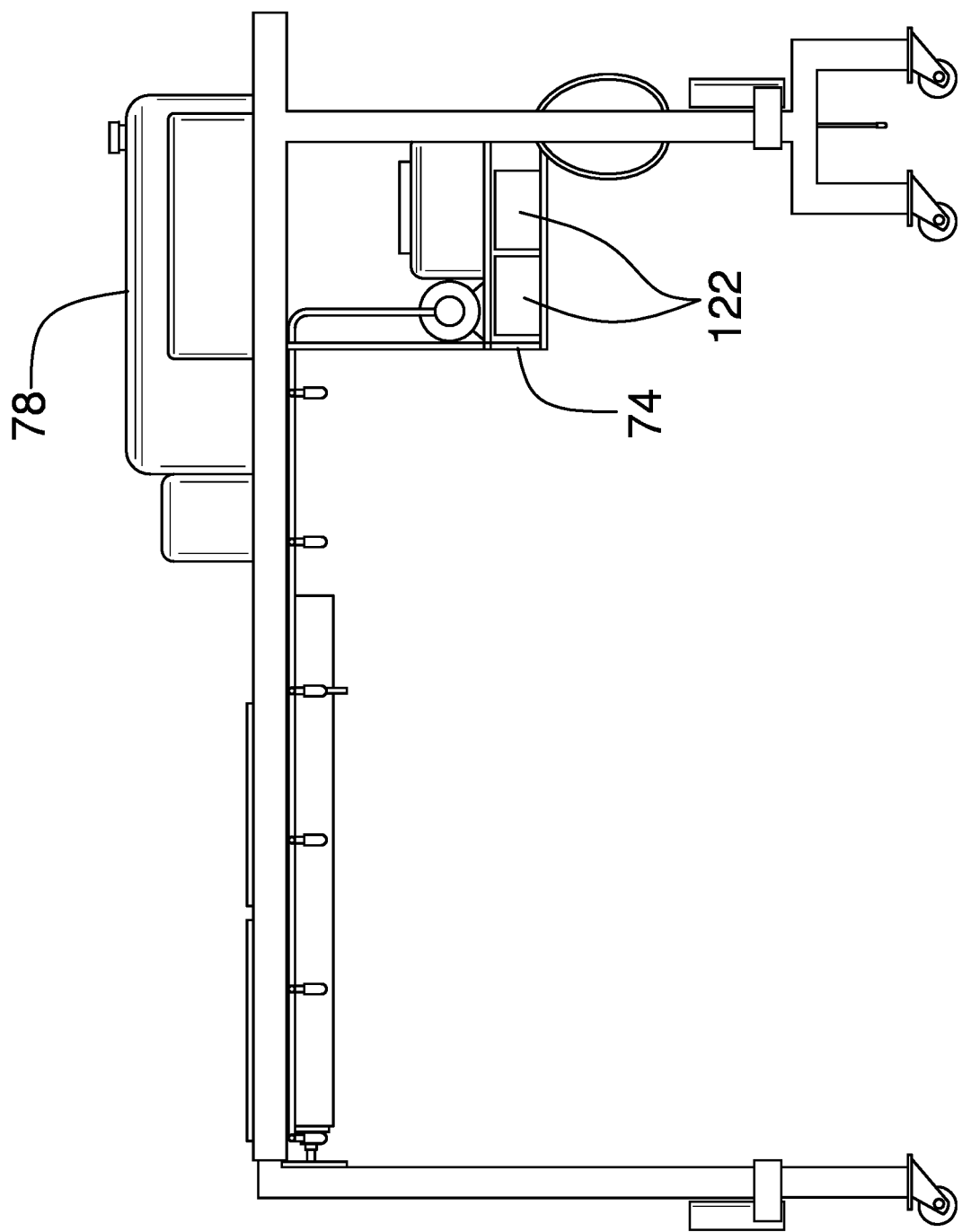
FIG. 6 is a right side view of an embodiment of the disclosure.
Figure 7:
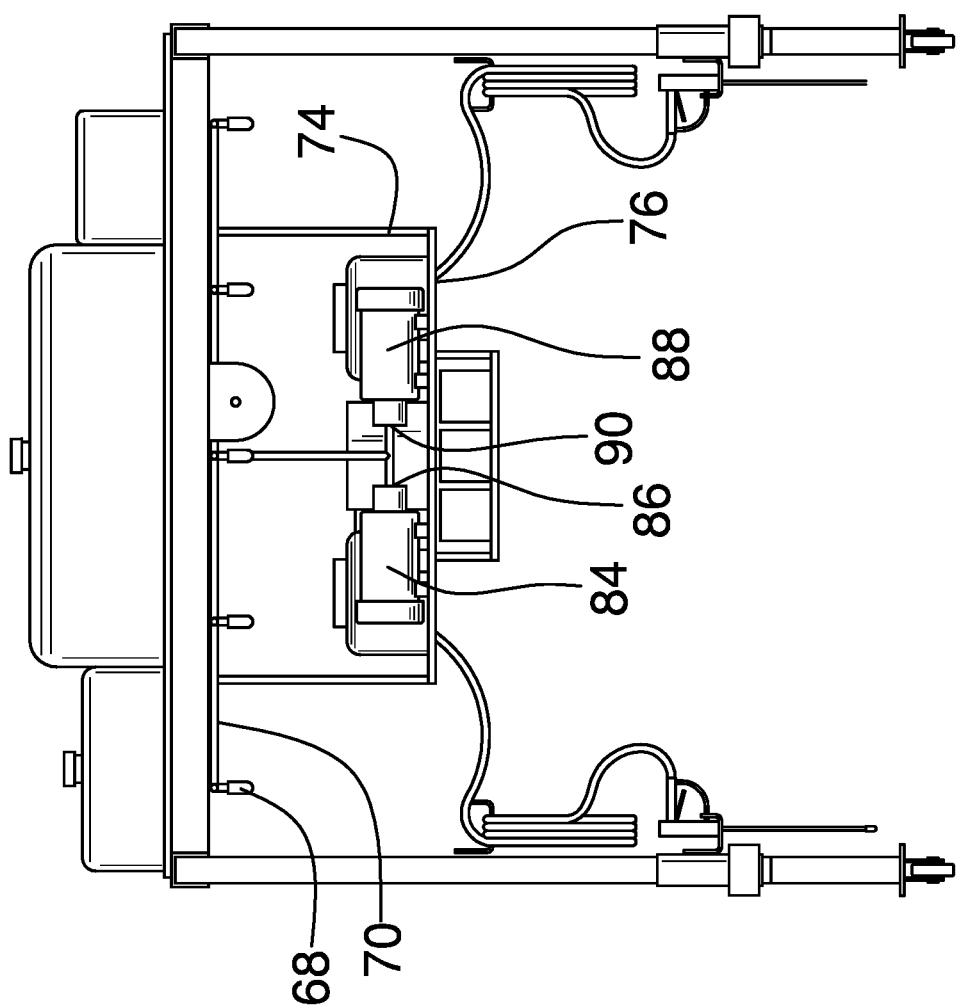
FIG. 7 is a back view of an embodiment of the disclosure.
Figure 8:
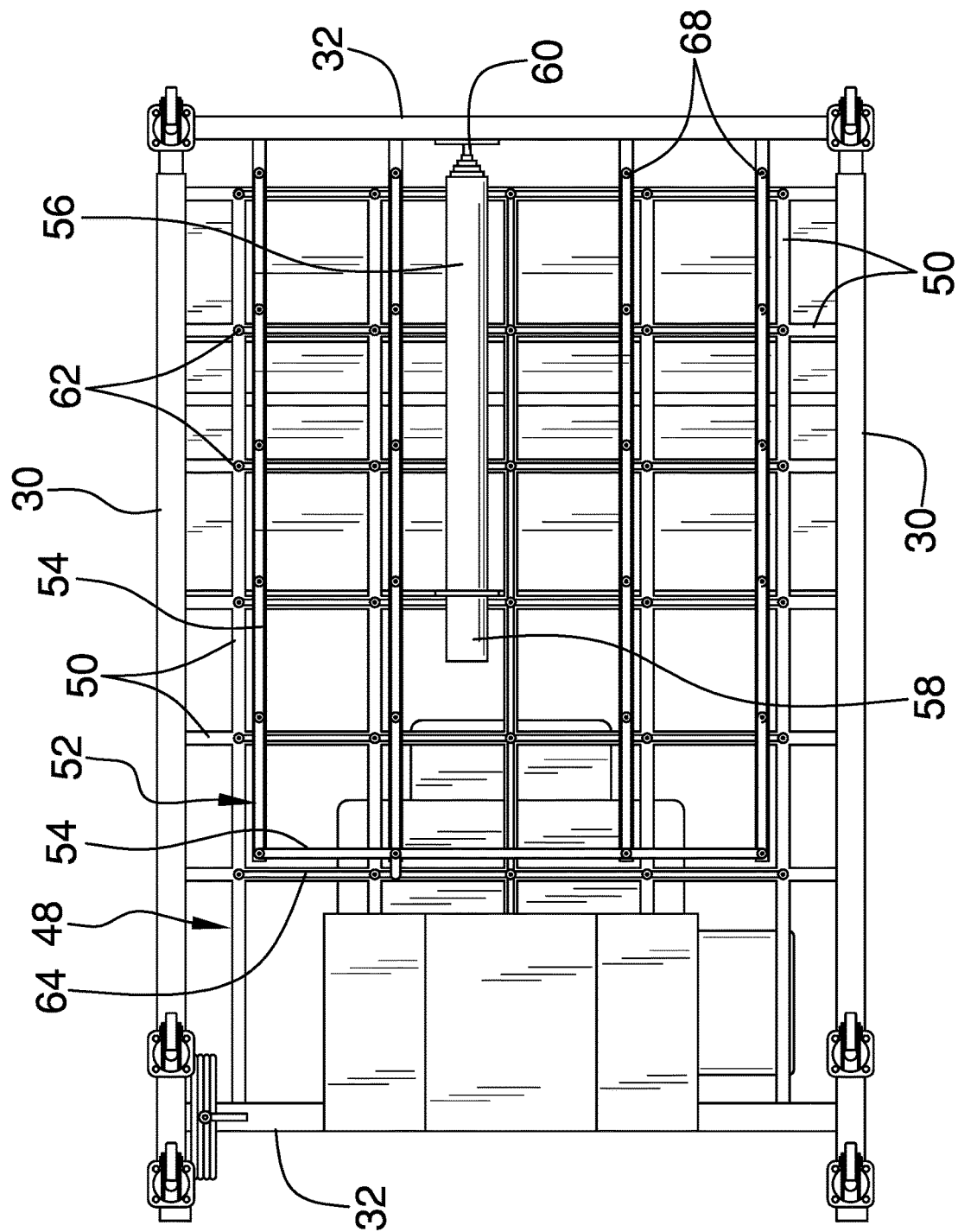
FIG. 8 is a bottom view of an embodiment of the disclosure.
Figure 9:
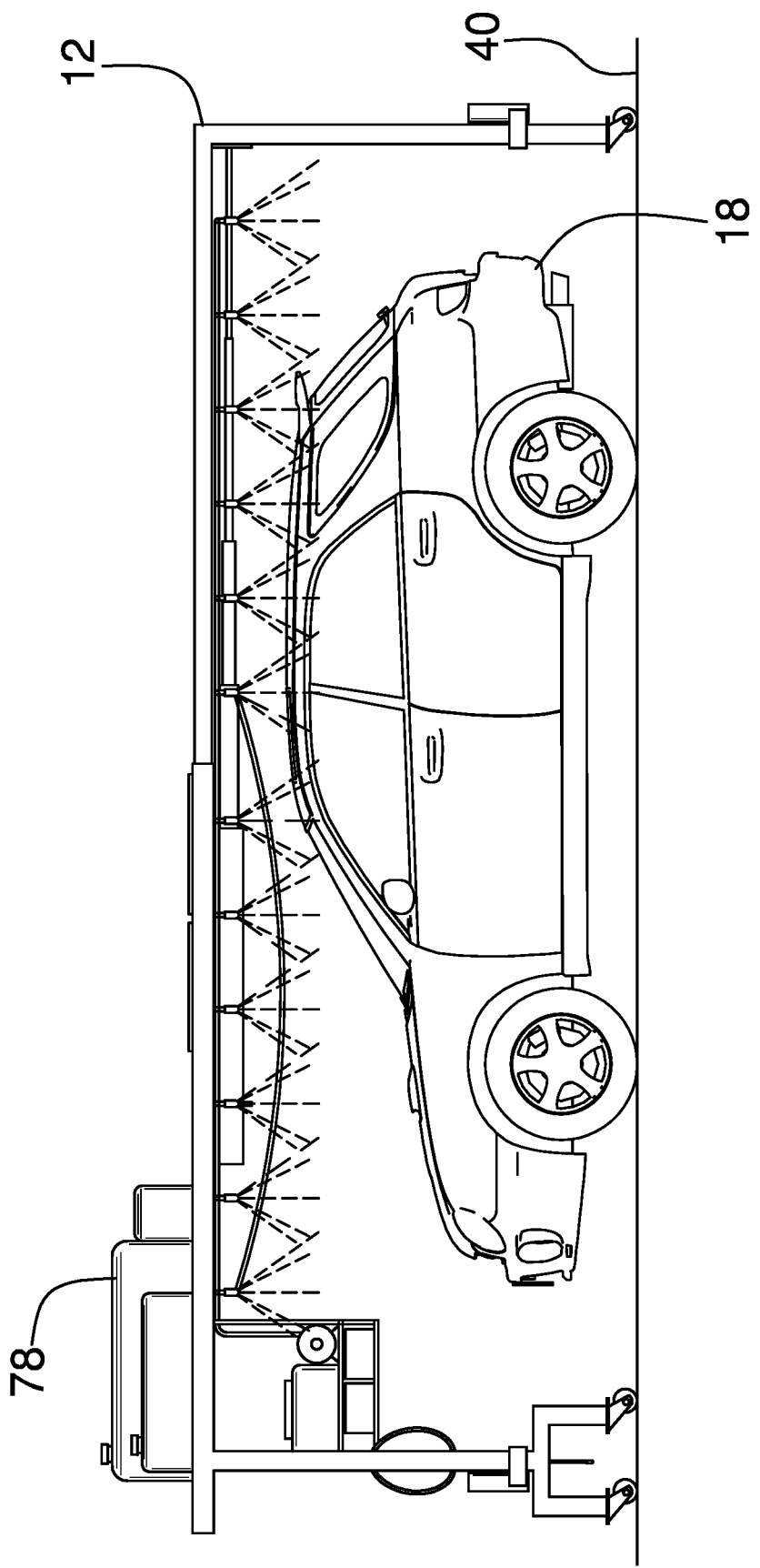
FIG. 9 is a perspective in-use view of an embodiment of the disclosure.
Figure 10:
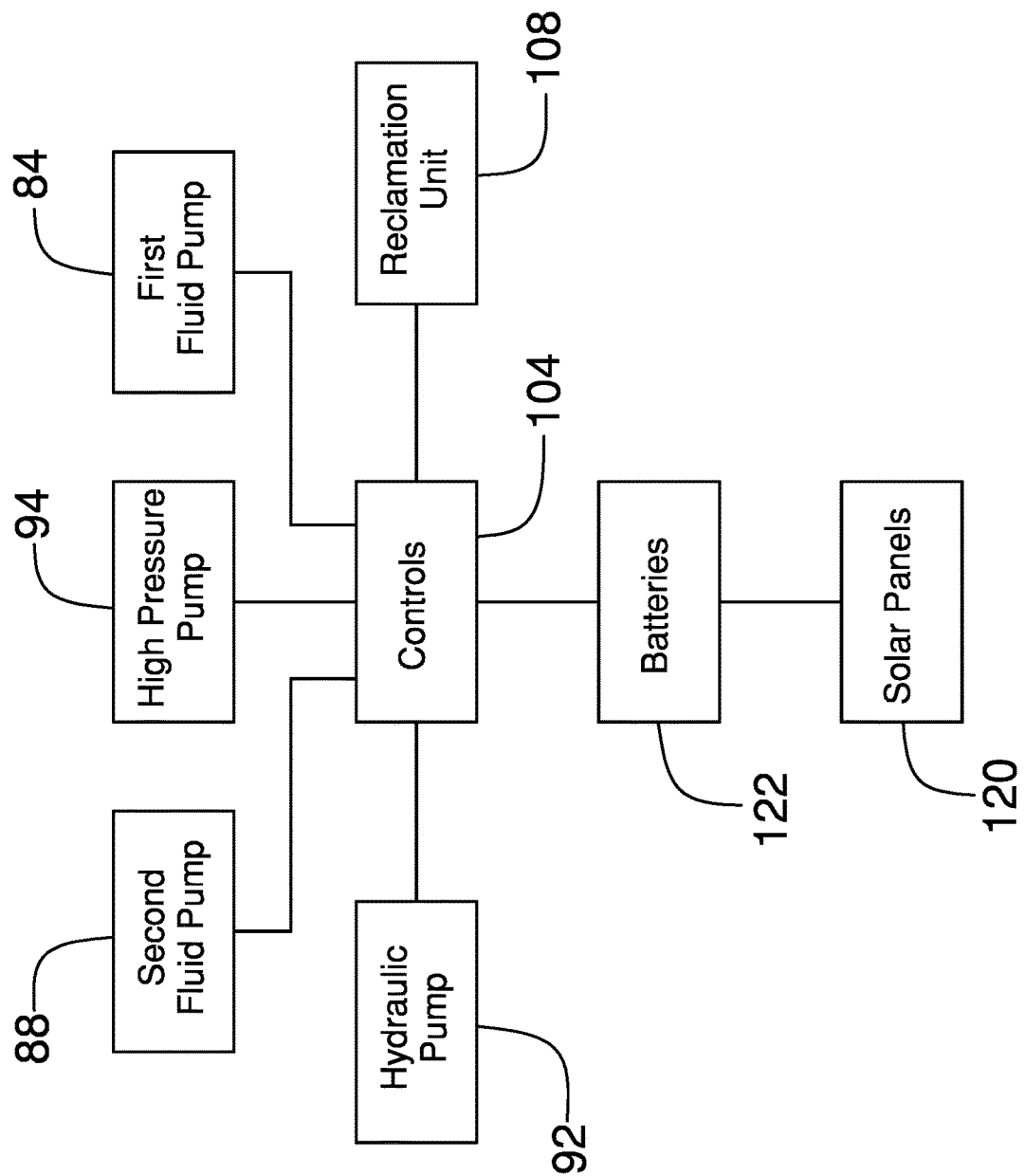
FIG. 10 is a schematic view of an embodiment of the disclosure.

With reference now to the drawings, and in particular to FIGS. 1 through 10 thereof, a new washing device embodying the principles and concepts of an embodiment of the disclosure and generally designated by the reference numeral 10 will be described.

As best illustrated in FIGS. 1 through 1, the portable vehicle washing assembly 10 generally comprises a frame 12 which includes a plurality of legs 14 and a roof 16 for having a vehicle 18 drive beneath the frame 12. Each of the legs 14 comprises a first portion 20 that slidably engages a second portion 22 such that each of legs 14 has a telescopically adjustable height. The plurality of legs 14 includes pair of front legs 24 and a pair of rear legs 26. The second portion 22 of each of the front legs 24 includes a pair of feet 28 that are spaced apart from each other. The roof 16 comprises a pair of side members 30 extending between a pair of end members 32. Additionally, each of the side members 30 comprises a primary section 34 slidably engaging a secondary section 36 such that the roof 16 has a telescopically adjustable length. Each of the legs 14 may have minimum height of approximately 7.0 feet and a maximum length of at least 9.0 feet. The roof 16 may have a minimum length of approximately 10.0 feet and a maximum length of at least 20.0 feet, and the roof 16 may have a width of at least 7.5 feet.

A plurality of rollers 38 is each rotatably coupled to a respective one of the legs 14 to roll the frame 12 along a support surface 40, such as parking lot or other support surface 40 on which vehicles are driven. Each of the plurality of rollers 38 is positioned on a distal end 42 of respective one of the rear legs 26 and distal end 44 of a respective one of the feet 28 on the front legs 24. Each of the rollers 38 might comprise a caster, a wheel or any other type of roller.

A plurality of lifting units 46 is each coupled to a respective one of the legs 14 and each of the lifting units 46 engages the second portion 22 of the respective leg 14. Each of the lifting units 46 urges the second portion 22 of the respective leg 14 downwardly out of the first portion 20 of the respective leg 14 when the lifting units 46 is actuated in a lifting condition for lifting the roof 16. In this way the roof 16 can accommodate the height of a vehicle 18. The vehicle 18 may be a passenger vehicle such as a car, a pickup or other type of motorized vehicle that is driven on public roadways. Each of the lifting units 46 urges the second portion 22 of the respective leg 14 into the first portion 20 of the respective leg 14 when the lifting units 46 are actuated into a lowering condition. In this way the roof 16 is lowered thereby facilitating the frame 12 to be transported. Each of the lifting units 46 might include an electric motor and a gear that engages a track in the second portion 22 of the respective leg 14, a hydraulic actuator or any other type of mechanism that is capable of lifting and lowering the legs 14.

A first lattice 48 is provided that comprises a plurality of intersecting members 50. The first lattice 48 is coupled to the roof 16 having the first lattice 48 lying on a plane that is coplanar with the roof 16. The first lattice 48 is coupled to the primary section 34 of each of each of the side members 30 and the first lattice 48 extends along a full length of the primary section 34. A second lattice 52 is provided that comprises a plurality of intersecting members 54. The second lattice 52 is coupled to the roof 16 having the second lattice 52 being spaced below the first lattice 48. The second lattice 52 lies on a plane that is coplanar with the first lattice 48 and the second lattice 52 is coupled to a respective one of the end members 32 of the roof 16.

A hydraulic actuator 56 is provided that has a first end 58 and a second end 60, and the first end 58 of the hydraulic actuator 56 is coupled to the first lattice 48. The second end 60 of the hydraulic actuator 56 is coupled to the end member 32 of the roof 16 to which the second lattice 52 is attached. The hydraulic actuator 56 elongates when the hydraulic actuator 56 is actuated into an elongated condition thereby facilitating the roof 16 to be elongated to accommodate the length of the vehicle 18. Conversely, the hydraulic actuator 56 shortens when the hydraulic actuator 56 is actuated into a shortening condition to shorten the roof 16 thereby facilitating the frame 12 to be transported.

A plurality of first sprinklers 62 is provided and each of the first sprinklers 62 is coupled to the first lattice 48. Each of the first sprinklers 62 is directed downwardly from the first lattice 48 to spray a fluid 63 onto the vehicle 18. Each of the first sprinklers 62 is aligned with an intersection between respective ones of the intersecting members 50 of the first lattice 48. Each of the first sprinklers 62 may comprise a high pressure sprinkler that would commonly be employed on an automatic car wash or the like. A plurality of first conduits 64 is each fluidly coupled to respective ones of the first sprinklers 62. The plurality of first conduits 64 is in fluid communication with each other and the plurality of first conduits 64 has a common inlet 66.

A plurality of second sprinklers 68 is provided and each of the second sprinklers 68 is coupled to the second lattice 52. Each of the second sprinklers 68 is directed downwardly from the second lattice 52 to spray a fluid 63 onto the vehicle 18. Each of the second sprinklers 68 is aligned with an intersection between respective ones of the intersecting members 54 of the second lattice 52. Additionally, each of the second sprinklers 68 may comprise a high pressure sprinkler that would commonly be employed on an automatic car wash or the like. A plurality of second conduits 70 is provided and each of the second conduits 70 is fluidly coupled to respective ones of the second sprinklers 68. The plurality of second conduits 70 is in fluid communication with each other and the plurality of second conduits 70 has a common inlet 72.

A support cage 74 is coupled to and extends downwardly from the roof 16, and the support cage 74 includes a floor 76. A fluid reservoir 78 is disposed on the roof 16 to contain the fluid 63, and the fluid reservoir 78 is positioned on top of the first lattice 48. A soap reservoir 80 is disposed on the roof 16 to contain a liquid soap 82 and the soap reservoir 80 is positioned on top of the first lattice 48. The liquid soap 82 may be a mixture of detergents commonly employed for washing cars, including but not being limited to, liquid soap, polishing agents, drying agents and waxing agents; the fluid 63 contained in the fluid reservoir 78 may be water.

A first fluid pump 84 is disposed on the support cage 74 and the first fluid pump 84 is in fluid communication with each of the fluid reservoir 78 and the soap reservoir 80. In this way the first fluid pump 84 can pump the fluid 63 and the liquid soap 82. The first fluid pump 84 is in fluid communication with each of the first sprinklers 62 to spray a mixture of the fluid 63 and the liquid soap 82 onto the vehicle 18 for washing the vehicle 18. The first fluid pump 84 has an output 86 that is fluidly coupled to the common inlet 66 of the plurality of first conduits 64, and the first fluid pump 84 is positioned on the floor 76 of the support cage 74.

A second fluid pump 88 is disposed on the support cage 74 and the second fluid pump 88 is in fluid communication with each of the fluid reservoir 78 and the soap reservoir 80. In this way the second fluid pump 88 can pump the fluid 63 and the liquid soap 82. The second fluid pump 88 is in fluid communication with each of the second sprinklers 68 to spray a mixture of the fluid 63 and the liquid soap 82 onto the vehicle 18 for washing the vehicle 18. The second fluid pump 88 has an output 90 that is fluidly coupled to the common inlet 72 of the plurality of second conduits 70, and the second fluid pump 88 is positioned on the floor 76 of the support cage 74. Each of the first fluid pump 84 and the second fluid pump 88 may comprise an electric fluid pump that has an output capacity similar to that of a fluid pump employed in an automatic car wash.

A hydraulic pump 92 is disposed on the support cage 74 and the hydraulic pump 92 may contain a hydraulic fluid. The hydraulic pump 92 is in fluid communication with the hydraulic actuator 56 and the hydraulic actuator 56 is actuated into the elongating condition when the hydraulic pump 92 is actuated into a send condition. Additionally, the hydraulic actuator 56 is actuated into the shortening condition when the hydraulic pump 92 is actuated into a return condition. The hydraulic pump 92 may comprise an electric hydraulic pump that pumps hydraulic oil.

A high pressure pump 94 is disposed on the support cage 74 and the high pressure pump 94 is in fluid communication with the fluid reservoir 78 and the soap reservoir 80. In this way the high pressure pump 94 can pump the fluid 63 and the liquid soap 82. The high pressure pump 94 has an output 96, and the high pressure pump 94 may be an electric fluid pump with an output pressure ranging between approximately 1000.0 psi and 2000.0 psi. A pair of hoses 98 is each fluidly coupled to the output 94 of the high pressure pump 94 such that each of the hoses 98 can receive the fluid 63 and the liquid soap 64 from the high pressure pump 94. Each of the hoses 98 has a distal end 100 with respect to the high pressure pump 94. A pair of spray wands 102 is each fluidly coupled to a respective one of the hoses 98 and each of the spray wands 102 is actuatable into a spraying condition to spray the fluid 63 and the liquid soap 82 for washing the vehicle 18. Each of the spray wands 102 can be manipulated by a worker for manually washing the vehicle 18 and to prepare the vehicle 18 for being washed by the first sprinklers 62 and the second sprinklers 68.

A control 104 is mounted to the frame 12 and the control 104 is in electrical communication with each of the lifting units 46, the first fluid pump 84, the second fluid pump 88, the hydraulic pump 92 and the high pressure pump 94. The control 104 includes a plurality of control buttons 106 for controlling operational parameters of each of the lifting units 46, the first fluid pump 84, the second fluid pump 88, the hydraulic pump 92 and the high pressure pump 94.

A reclamation unit 108 is disposed on the roof 16. The reclamation unit 108 may include a vacuum pump that is in fluid communication with the fluid reservoir 78. A reclamation mat 110 is positionable on a support surface 40 beneath the roof 16 and the reclamation mat 110 is driven upon by the vehicle 18 when the vehicle 18 drives under the roof 16 of the frame 12. Additionally, the reclamation mat 110 is foraminous to facilitate the fluid and the liquid soap 82 to flow into the reclamation mat 110. Additionally, the reclamation mat 110 may define a pan that captures the fluid 63 and the liquid soap 82.

A reclamation hose 112 is fluid coupled between the reclamation unit 108 and the reclamation mat 110 to suctionally remove the fluid 63 and the liquid soap 82 from the reclamation mat 110 for recycling purposes. A curtain 114 is extendable around the roof 16 of the frame 12 to surround the vehicle 18. The curtain 114 is comprised of a fluid impermeable material to contain the fluid and the liquid soap 82. Additionally, the curtain 114 has a plurality of vertical pleats 116 such that the curtain 114 is collapsible on the frame 12 into a stored position.

A power supply 118 is integrated into the frame 12 and the power supply 118 is in electrical communication with the control 104. The power supply 118 comprises a plurality of solar panels 120 that is each positioned on top of the roof 16 such that each of the solar panels 120 is exposed to sunlight. A plurality of batteries 122 is each positioned on the support cage 74 and each of the batteries 122 is electrically coupled to the control 104. Each of the batteries 122 is electrically coupled to the solar panels 120 for charging the batteries 122.

In use, the frame 12 is transported on a trailer to a remote location, such as parking lot or other area where vehicles can be driven. The frame 12 is removed from the trailer and the frame 12 is positioned in a desired location. The control 104 is manipulated to raise the legs 14 to a desired height and to elongate the roof 16 to a desired length. In this way a vehicle 18 can be driven beneath the roof 16 of the frame 12 for washing. Additionally, the reclamation mat 110 is laid on the ground beneath the roof 16 of the frame 12 and the reclamation hose 112 is coupled to the reclamation mat 110. Each of the first fluid pump 84 and the second fluid pump 88 is turned on to spray the fluid 63 and the liquid soap 82 onto the vehicle 18 to wash the vehicle 18. Additionally, the spray wand 102 can be employed to enhance washing the vehicle 18 to remove deposits of dirt or mud. The reclamation mat 110 captures the fluid 63 and the liquid soap 82 for the purposes of recycling. In this way one or more vehicles can be washed in a remote location.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable vehicle washing assembly for being transported to a remote location for washing vehicles, said assembly comprising:
    a frame including a plurality of legs and a roof wherein said frame is configured to have a vehicle drive beneath said frame;
    a plurality of rollers, each of said rollers being rotatably coupled to a respective one of said legs wherein said plurality of rollers is configured to roll said frame along a support surface;
    a first lattice comprising a plurality of intersecting members, said first lattice being coupled to said roof having said first lattice lying on a plane being coplanar with said roof;
    a second lattice comprising a plurality of intersecting members, said second lattice being coupled to said roof having said second lattice being spaced below said first lattice, said second lattice lying on a plane being coplanar with said first lattice;
    a plurality of first sprinklers, each of said first sprinklers being coupled to said first lattice, each of said first sprinklers being directed downwardly from said first lattice wherein each of said first sprinklers is configured to spray a liquid onto the vehicle;
    a plurality of second sprinklers, each of said second sprinklers being coupled to said second lattice, each of said second sprinklers being directed downwardly from said second lattice wherein said each of said second sprinklers is configured to spray a liquid onto the vehicle;
    a support cage being coupled to and extending downwardly from said roof, said support cage including a floor;
    a fluid reservoir being disposed on said roof wherein said fluid reservoir is configured to contain a fluid;

a soap reservoir being disposed on said roof wherein said soap reservoir is configured to contain a liquid soap;
a first fluid pump being disposed on said support cage, said first fluid pump being in fluid communication with each of said fluid reservoir and said soap reservoir wherein said first fluid pump is configured to pump the fluid and the liquid soap, said first fluid pump being in fluid communication with each of said first sprinklers wherein each of said first sprinklers is configured to spray a mixture of the fluid and the liquid soap onto the vehicle for washing the vehicle; and
a second fluid pump being disposed on said support cage, said second fluid pump being in fluid communication with each of said fluid reservoir and said soap reservoir wherein said second fluid pump is configured to pump the fluid and the liquid soap, said second fluid pump being in fluid communication with each of said second sprinklers wherein each of said second sprinklers is configured to spray a mixture of the fluid and the liquid soap onto the vehicle for washing the vehicle.

2. The assembly according to claim 1, wherein each of said legs comprises a first portion slidably engaging a second portion such that each of legs has a telescopically adjustable height, said plurality of legs including pair of front legs, and a pair of rear legs, said second portion of each of said front legs including a pair of feet being spaced apart from each other, said roof comprising a pair of side members extending between a pair of end members, each of said side members comprising a primary section slidably engaging a secondary section such that said roof has a telescopically adjustable length.

3. The assembly according to claim 2, further comprising a plurality of lifting units, each of said lifting units being coupled to a respective one of said legs, each of said lifting units engaging said second portion of said respective leg, each of said lifting units urging said second portion of said respective leg downwardly out of said first portion of said respective leg when said lifting units is actuated in a lifting condition for lifting said roof wherein said roof is configured to accommodate the height of a vehicle, each of said lifting units urging said second portion of said respective leg into said first portion of said respective leg when said lifting units is actuated into a lowering condition for lowering said roof thereby facilitating said frame to be transported.

4. The assembly according to claim 2, wherein:
said first lattice is coupled to said primary section of each of each of said side members, said first lattice extending along a full length of said primary section; and
said second lattice is coupled to a respective one of said end members of said roof.

5. The assembly according to claim 4, further comprising a hydraulic actuator having a first end a second end, said first end of said hydraulic actuator coupled to said first lattice, said second end of said hydraulic actuator being coupled to said end member of said roof to which said second lattice is attached, said hydraulic actuator elongating when said hydraulic actuator is actuated into an elongated condition thereby facilitating said roof to be elongated wherein said roof is configured to accommodate the length of the vehicle, said hydraulic actuator shortening when said hydraulic actuator is actuated into a shortening condition thereby facilitating said roof to be shortened thereby facilitating said frame to be transported.

6. The assembly according to claim 5, further comprising a hydraulic pump being disposed on said support cage wherein said hydraulic pump is configured to contain a hydraulic fluid, said hydraulic pump being in fluid communication with said hydraulic actuator, said hydraulic actuator being actuated into said elongating condition when said hydraulic pump is actuated into a send condition, said hydraulic actuator being actuated into said shortening condition when said hydraulic pump is actuated into a return condition.

7. The assembly according to claim 1, further comprising a plurality of first conduits, each of said first conduits being fluidly coupled to respective ones of said first sprinklers, said plurality of first conduits being in fluid communication with each other, said plurality of first conduits having a common inlet.

8. The assembly according to claim 7, further comprising a plurality of second conduits, each of said second conduits being fluidly coupled to respective ones of said second sprinklers, said plurality of second conduits being in fluid communication with each other, said plurality of second conduits having a common inlet.

9. The assembly according to claim 7, wherein said first fluid pump has an output being fluidly coupled to said common inlet of said plurality of first conduits, said first fluid pump being positioned on said floor of said cage.

10. The assembly according to claim 8, wherein said second fluid pump has an output being fluidly coupled to said common inlet of said plurality of second conduits, said second fluid pump being positioned on said floor of said cage.

11. The assembly according to claim 1, further comprising a high pressure pump being disposed on said support cage, said high pressure pump being in fluid communication with said fluid reservoir and said soap reservoir wherein said high pressure pump is configured to pump the liquid and the fluid soap, said high pressure pump having an output.

12. The assembly according to claim 11, further comprising a hose being fluidly coupled to said output of said high pressure pump wherein said hose is configured to receive the liquid and the fluid soap from said high pressure pump, said hose having a distal end with respect to said high pressure pump.

13. The assembly according to claim 12, further comprising a spray wand being fluidly coupled to said hose wherein said spray wand is configured to be manipulated by a worker, said spray wand being actuatable into a spraying condition wherein said spray wand is configured to spray the liquid and the fluid soap for washing the vehicle.

14. The assembly according to claim 1, further comprising:
a high pressure pump being disposed on said support cage;
a hydraulic pump being disposed on said support cage;
a plurality of lifting units each being coupled to a respective one of said legs, and
a control being mounted to said frame, said control being in electrical communication with each of said lifting units, said first fluid pump, said second fluid pump, said hydraulic pump and said high pressure pump, said control including a plurality of control buttons for controlling operational parameters of each of said lifting units, said first fluid pump, said second fluid pump, said hydraulic pump and said high pressure pump.

15. The assembly according to claim 14, further comprising a power supply being integrated into said frame, said power supply being in electrical communication with said control, said power supply comprising:
a plurality of solar panels, each of said solar panels being positioned on top of said roof wherein each of said solar panels is configured to be exposed to sunlight; and a plurality of batteries, each of said batteries being positioned on said support cage, each of said batteries being electrically coupled to said control, each of said batteries being electrically coupled to said solar panels for charging said batteries.

16. The assembly according to claim 1, further comprising
a reclamation unit being disposed on said roof;
a reclamation mat being positionable on a support surface beneath said roof wherein said reclamation mat is configured to be driven upon by the vehicle, said reclamation mat being foraminous wherein said reclamation mat is configured to facilitate the fluid and the liquid soap to flow into said reclamation mat; and
a reclamation hose being fluid coupled between said reclamation unit and said reclamation mat wherein said reclamation unit is configured to suctionally remove the fluid and the liquid soap from said reclamation mat for recycling purposes.

17. The assembly according to claim 1, further comprising a curtain being extendable around said roof of said frame wherein said curtain is configured to surround the vehicle, said curtain being comprised of a fluid impermeable material wherein said curtain is configured to contain the fluid and the liquid soap, said curtain having a plurality of vertical pleats such that said curtain is collapsible on said frame into a stored position.

18. A portable vehicle washing assembly for being transported to a remote location for washing vehicles, said assembly comprising:
a frame including a plurality of legs and a roof wherein said frame is configured to have a vehicle drive beneath said frame, each of said legs comprising a first portion slidably engaging a second portion such that each of legs has a telescopically adjustable height, said plurality of legs including pair of front legs, and a pair of rear legs, said second portion of each of said front legs including a pair of feet being spaced apart from each other, said roof comprising a pair of side members extending between a pair of end members, each of said side members comprising a primary section slidably engaging a secondary section such that said roof has a telescopically adjustable length;
a plurality of rollers, each of said rollers being rotatably coupled to a respective one of said legs wherein said plurality of rollers is configured to roll said frame along a support surface, each of said plurality of rollers being positioned on a distal end of respective one of said rear legs and distal end of a respective one of said feet on said front legs;
a plurality of lifting units, each of said lifting units being coupled to a respective one of said legs, each of said lifting units engaging said second portion of said respective leg, each of said lifting units urging said second portion of said respective leg downwardly out of said first portion of said respective leg when said lifting units is actuated in a lifting condition for lifting said roof wherein said roof is configured to accommodate the height of a vehicle, each of said lifting units urging said second portion of said respective leg into said first portion of said respective leg when said lifting units is actuated into a lowering condition for lowering said roof thereby facilitating said frame to be transported;
a first lattice comprising a plurality of intersecting members, said first lattice being coupled to said roof having said first lattice lying on a plane being coplanar with said roof, said first lattice being coupled to said primary section of each of said side members, said first lattice extending along a full length of said primary section;
a second lattice comprising a plurality of intersecting members, said second lattice being coupled to said roof having said second lattice being spaced below said first lattice, said second lattice lying on a plane being coplanar with said first lattice, said second lattice being coupled to a respective one of said end members of said roof;
a hydraulic actuator having a first end a second end, said first end of said hydraulic actuator coupled to said first lattice, said second end of said hydraulic actuator being coupled to said end member of said roof to which said second lattice is attached, said hydraulic actuator elongating when said hydraulic actuator is actuated into an elongated condition thereby facilitating said roof to be elongated wherein said roof is configured to accommodate the length of the vehicle, said hydraulic actuator shortening when said hydraulic actuator is actuated into a shortening condition thereby facilitating said roof to be shortened thereby facilitating said frame to be transported;
a plurality of first sprinklers, each of said first sprinklers being coupled to said first lattice, each of said first sprinklers being directed downwardly from said first lattice wherein each of said first sprinklers is configured to spray a liquid onto the vehicle, each of said first sprinklers being aligned with an intersection between respective ones of said intersecting members of said first lattice;
a plurality of first conduits, each of said first conduits being fluidly coupled to respective ones of said first sprinklers, said plurality of first conduits being in fluid communication with each other, said plurality of first conduits having a common inlet;
a plurality of second sprinklers, each of said second sprinklers being coupled to said second lattice, each of said second sprinklers being directed downwardly from said second lattice wherein said each of said second sprinklers is configured to spray a liquid onto the vehicle, each of said second sprinklers being aligned with an intersection between respective ones of said intersecting members of said second lattice;
a plurality of second conduits, each of said second conduits being fluidly coupled to respective ones of said second sprinklers, said plurality of second conduits being in fluid communication with each other, said plurality of second conduits having a common inlet;
a support cage being coupled to and extending downwardly from said roof, said support cage including a floor;
a fluid reservoir being disposed on said roof wherein said fluid reservoir is configured to contain a fluid, said fluid reservoir being positioned on top of said first lattice;
a soap reservoir being disposed on said roof wherein said soap reservoir is configured to contain a liquid soap, said soap reservoir being positioned on top of said first lattice;
a first fluid pump being disposed on said support cage, said first fluid pump being in fluid communication with each of said fluid reservoir and said soap reservoir wherein said first fluid pump is configured to pump the fluid and the liquid soap, said first fluid pump being in fluid communication with each of said first sprinklers wherein each of said first sprinklers is configured to spray a mixture of the fluid and the liquid soap onto the vehicle for washing the vehicle, said first fluid pump having an output being fluidly coupled to said common inlet of said plurality of first conduits, said first fluid pump being positioned on said floor of said cage;

a second fluid pump being disposed on said support cage, said second fluid pump being in fluid communication with each of said fluid reservoir and said soap reservoir wherein said second fluid pump is configured to pump the fluid and the liquid soap, said second fluid pump being in fluid communication with each of said second sprinklers wherein each of said second sprinklers is configured to spray a mixture of the fluid and the liquid soap onto the vehicle for washing the vehicle, said second fluid pump having an output being fluidly coupled to said common inlet of said plurality of second conduits, said second fluid pump being positioned on said floor of said cage;

a hydraulic pump being disposed on said support cage wherein said hydraulic pump is configured to contain a hydraulic fluid, said hydraulic pump being in fluid communication with said hydraulic actuator, said hydraulic actuator being actuated into said elongating condition when said hydraulic pump is actuated into a send condition, said hydraulic actuator being actuated into said shortening condition when said hydraulic pump is actuated into a return condition;

a high pressure pump being disposed on said support cage, said high pressure pump being in fluid communication with said fluid reservoir and said soap reservoir wherein said high pressure pump is configured to pump the liquid and the fluid soap, said high pressure pump having an output;

a hose being fluidly coupled to said output of said high pressure pump wherein said hose is configured to receive the liquid and the fluid soap from said high pressure pump, said hose having a distal end with respect to said high pressure pump;

a spray wand being fluidly coupled to said hose wherein said spray wand is configured to be manipulated by a worker, said spray wand being actuatable into a spraying condition wherein said spray wand is configured to spray the liquid and the fluid soap for washing the vehicle;

a control being mounted to said frame, said control being in electrical communication with each of said lifting units, said first fluid pump, said second fluid pump, said hydraulic pump and said high pressure pump, said control including a plurality of control buttons for controlling operational parameters of each of said lifting units, said first fluid pump, said second fluid pump, said hydraulic pump and said high pressure pump;

a reclamation unit being disposed on said roof;

a reclamation mat being positionable on a support surface beneath said roof wherein said reclamation mat is configured to be driven upon by the vehicle, said reclamation mat being foraminous wherein said reclamation mat is configured to facilitate the fluid and the liquid soap to flow into said reclamation mat;

a reclamation hose being fluid coupled between said reclamation unit and said reclamation mat wherein said reclamation unit is configured to suctionally remove the fluid and the liquid soap from said reclamation mat for recycling purposes;

a curtain being extendable around said roof of said frame wherein said curtain is configured to surround the vehicle, said curtain being comprised of a fluid impermeable material wherein said curtain is configured to contain the fluid and the liquid soap, said curtain having a plurality of vertical pleats such that said curtain is collapsible on said frame into a stored position; and a power supply being integrated into said frame, said power supply being in electrical communication with said control, said power supply comprising:
- a plurality of solar panels, each of said solar panels being positioned on top of said roof wherein each of said solar panels is configured to be exposed to sunlight; and
- a plurality of batteries, each of said batteries being positioned on said support cage, each of said batteries being electrically coupled to said control, each of said batteries being electrically coupled to said solar panels for charging said batteries.

* * * * *